United States Patent
Spencer et al.

(10) Patent No.: US 10,699,368 B1
(45) Date of Patent: Jun. 30, 2020

(54) MEMORY ALLOCATION TECHNIQUES FOR GRAPHICS SHADER

(71) Applicant: Apple Inc., Cupertino, CA (US)

(72) Inventors: Christopher L. Spencer, Chuluota, FL (US); Terence M. Potter, Austin, TX (US); Dimitri Tan, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/690,954

(22) Filed: Aug. 30, 2017

(51) Int. Cl.
  *G06T 1/60*    (2006.01)
  *G06T 15/80*   (2011.01)
  *G06T 15/00*   (2011.01)
  *G06T 1/20*    (2006.01)
  *G06F 12/02*   (2006.01)

(52) U.S. Cl.
  CPC .............. *G06T 1/60* (2013.01); *G06F 12/023* (2013.01); *G06T 1/20* (2013.01); *G06T 15/005* (2013.01); *G06T 15/80* (2013.01); *G06F 2212/1044* (2013.01)

(58) Field of Classification Search
  CPC . G06F 8/458; G06T 1/60; G06T 15/80; G06T 2210/52; G09G 5/363
  See application file for complete search history.

(56) References Cited

U.S. PATENT DOCUMENTS

| | | | |
|---|---|---|---|
| 8,698,814 B1 * | 4/2014 | Van Dyke | G09G 5/363 345/502 |
| 2013/0185728 A1 * | 7/2013 | Abdalla | G06F 9/4881 718/103 |
| 2015/0187117 A1 * | 7/2015 | Balci | G06T 1/20 345/522 |
| 2015/0193903 A1 | 7/2015 | Agarwal et al. | |
| 2016/0232645 A1 | 8/2016 | Wang | |
| 2016/0358307 A1 * | 12/2016 | Brothers | G06T 15/005 |
| 2017/0124757 A1 | 5/2017 | Sathe et al. | |
| 2017/0148203 A1 * | 5/2017 | Hakura | G06T 15/005 |
| 2017/0236246 A1 * | 8/2017 | Mrozek | G06F 9/5027 345/522 |

* cited by examiner

*Primary Examiner* — Samantha (Yuehan) Wang
(74) *Attorney, Agent, or Firm* — Kowert, Hood, Munyon, Rankin & Goetzel, P.C.

(57) ABSTRACT

Techniques are disclosed relating to memory allocation in a graphics shader. In some embodiments, a memory for storing input data for operations by the shader is shared for multiple different types of tasks (e.g., pixel shading tasks and compute tasks). In some embodiments, a graphics device is configured to separately process different portions (e.g., tiles) of a frame of graphics data. In some embodiments, the graphics device is configured to dynamically adjust the number of frame portions processed in parallel based on allocation information, where the allocation information is determined based on requests for other types of tasks. This may prevent pixel shading tasks from stalling other tasks for extended periods and may allow dynamic adjustments memory allocation mid-render.

20 Claims, 7 Drawing Sheets

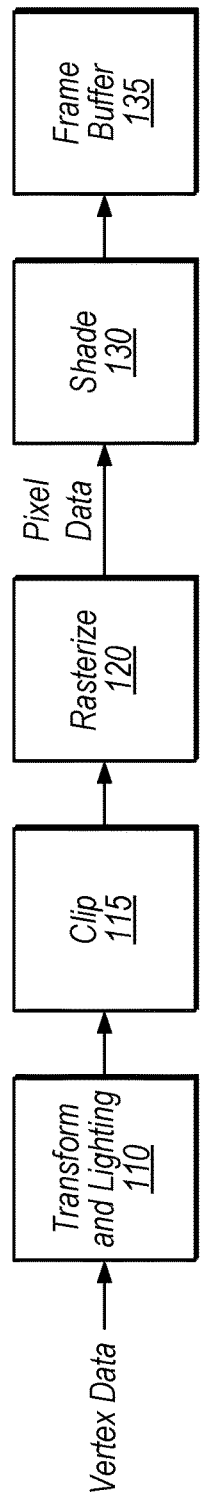
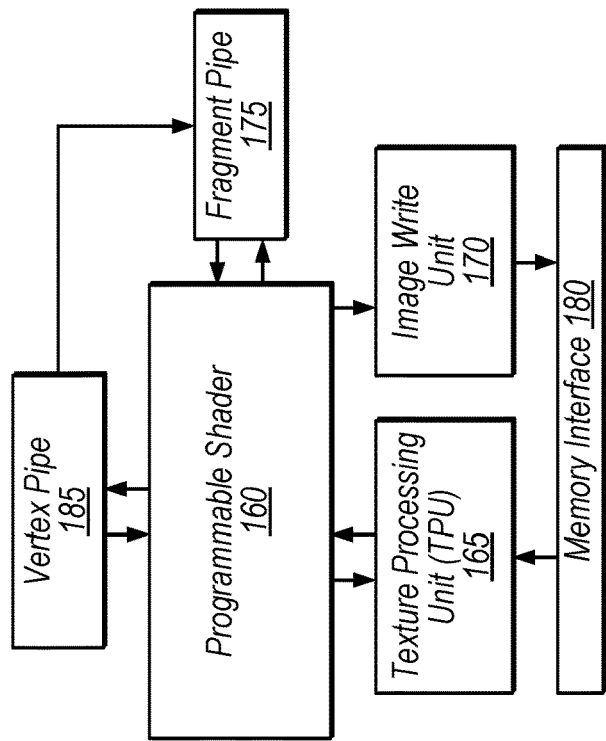

MEMORY ALLOCATION TECHNIQUES FOR GRAPHICS SHADER

BACKGROUND

Technical Field

This disclosure relates generally to graphics processors and more specifically to techniques for memory allocation in a programmable shader.

Description of the Related Art

Graphics processors typically include one or more programmable shaders configured to perform various processing tasks based on executed graphics programs. This may including shading tasks that process fragment data to determine pixels attributes and performing other compute tasks. Different control circuitry may request pixel tasks and compute tasks. Memory space in the programmable shader may be limited (e.g., memory used to store input data being processed) and may be shared between pixel tasks and other tasks. If pixel tasks are using a substantial portion of the programmable shader's memory space, high-priority compute tasks may be stalled waiting for memory.

BRIEF DESCRIPTION OF THE DRAWINGS

FIG. 1A is a block diagram illustrating an exemplary graphics processing flow.

FIG. 1B is a block diagram illustrating one embodiment of a graphics unit.

Figure 2:
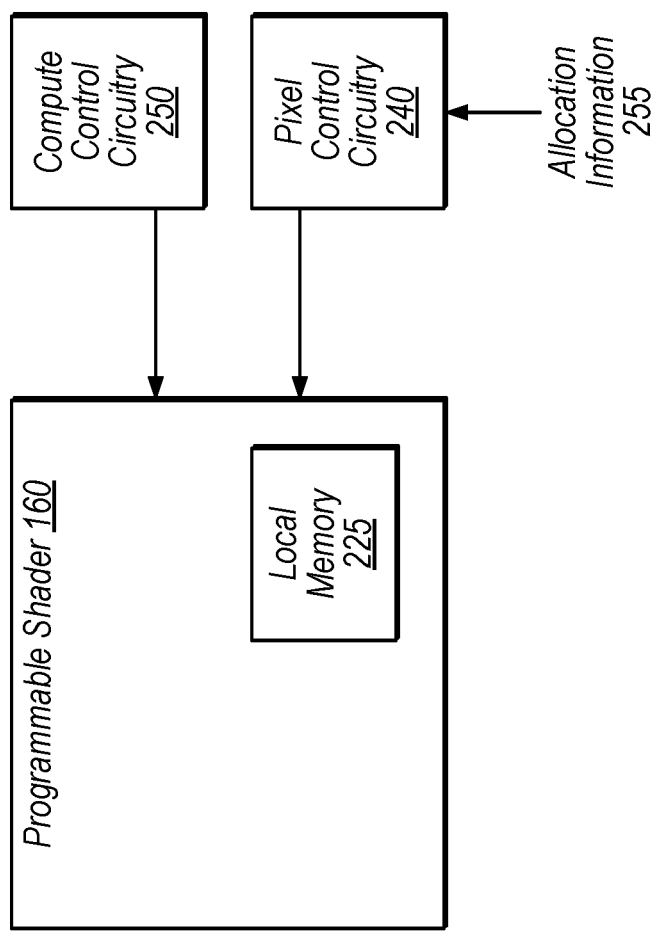
FIG. 2 is a block diagram illustrating an exemplary programmable shader that includes a memory shared by different types of tasks, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Further, as used herein, the terms "first," "second," "third," etc. do not necessarily imply an ordering (e.g., temporal) between elements. For example, a referring to a "first" graphics operation and a "second" graphics operation does not imply an ordering of the graphics operation, absent additional language constraining the temporal relationship between these operations. In short, references such as "first," "second," etc. are used as labels for ease of reference in the description and the appended claims.

DETAILED DESCRIPTION

Figure 3:
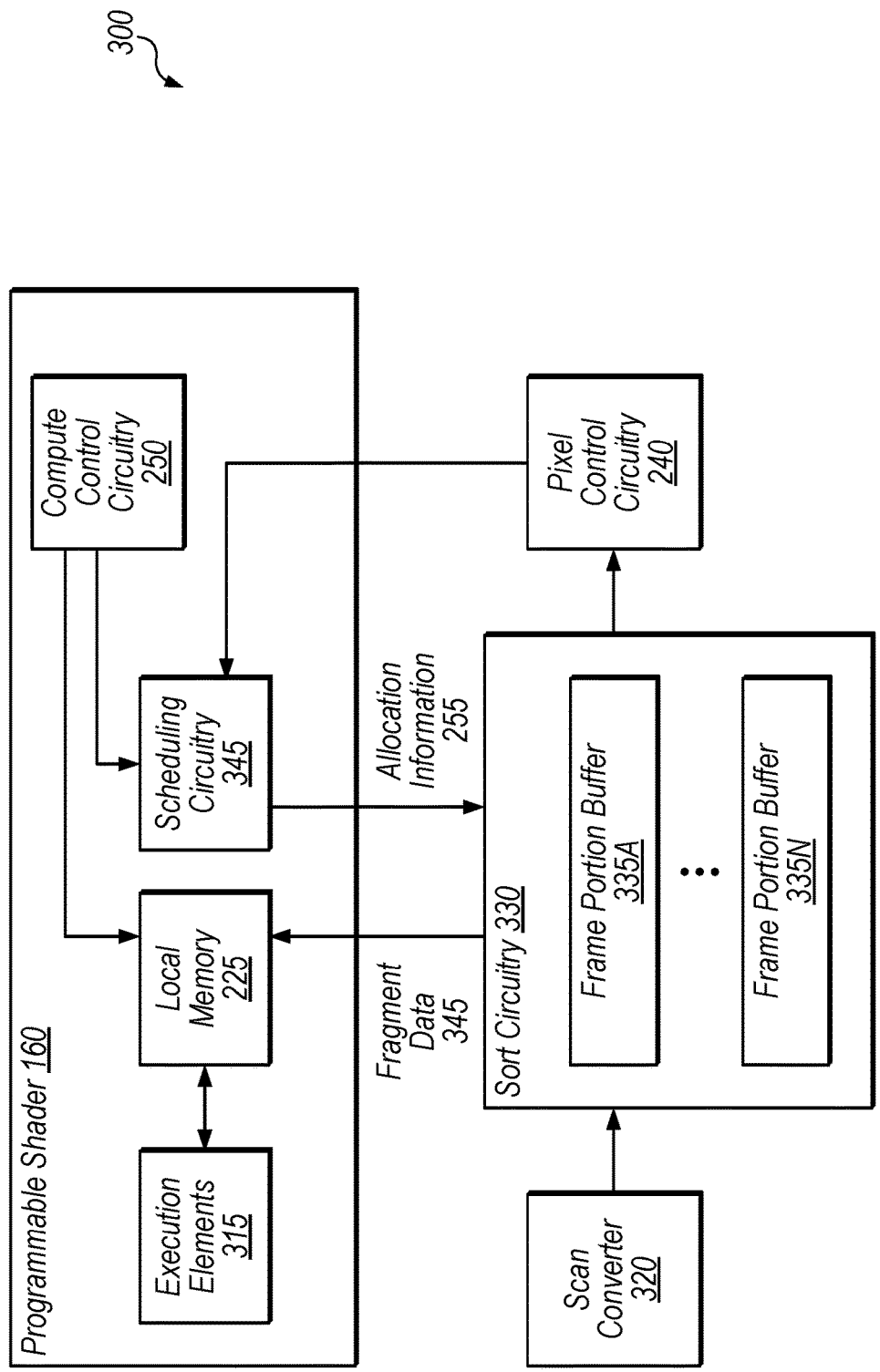
FIG. 3 is a block diagram illustrating a more detailed example of the circuitry of FIG. 2 that includes circuitry configured to process multiple frame portions in parallel, according to some embodiments.
Figure 4:
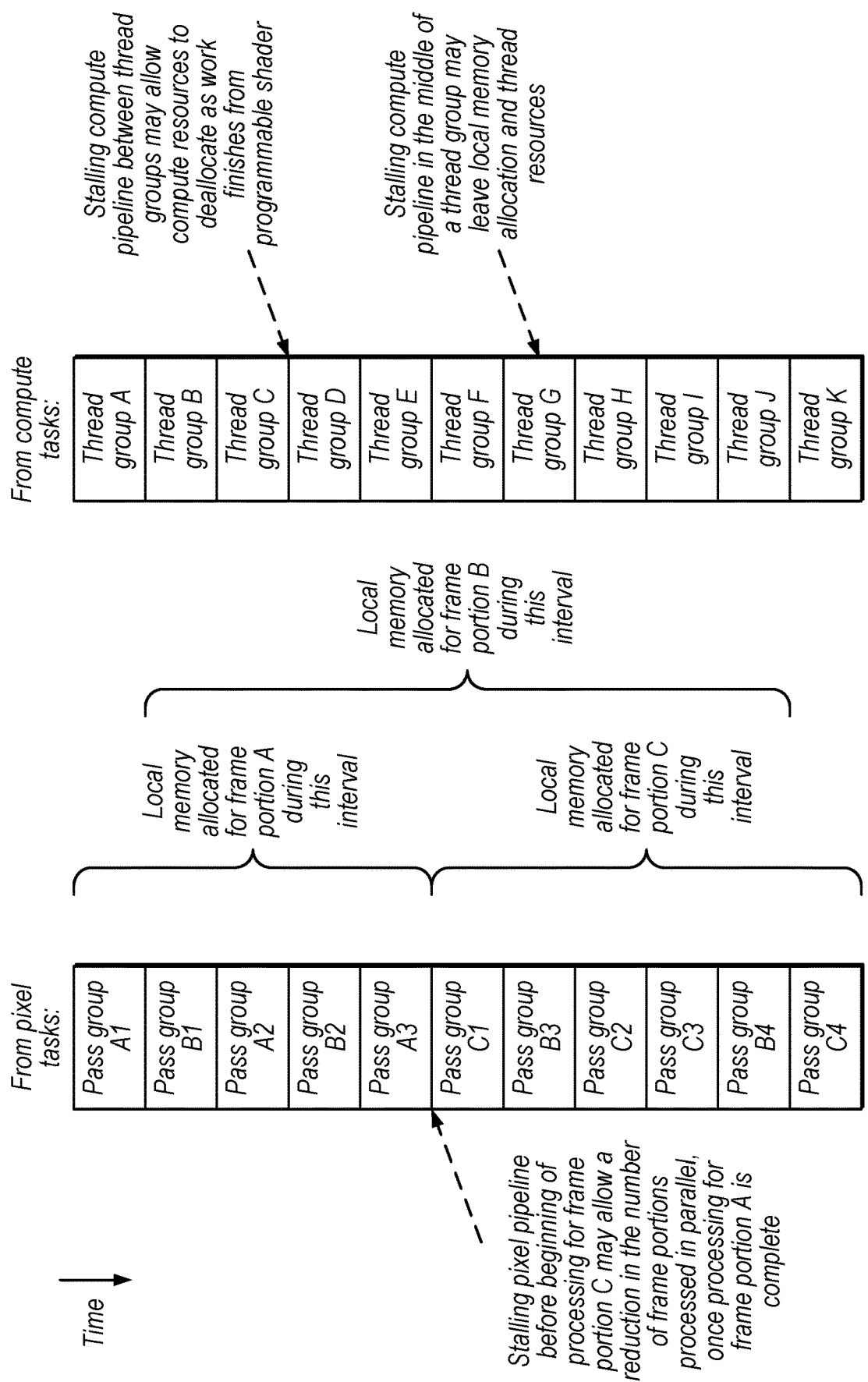
FIG. 4 is a diagram illustrating exemplary allocation intervals for different types of tasks, according to some embodiments.
Figure 5:
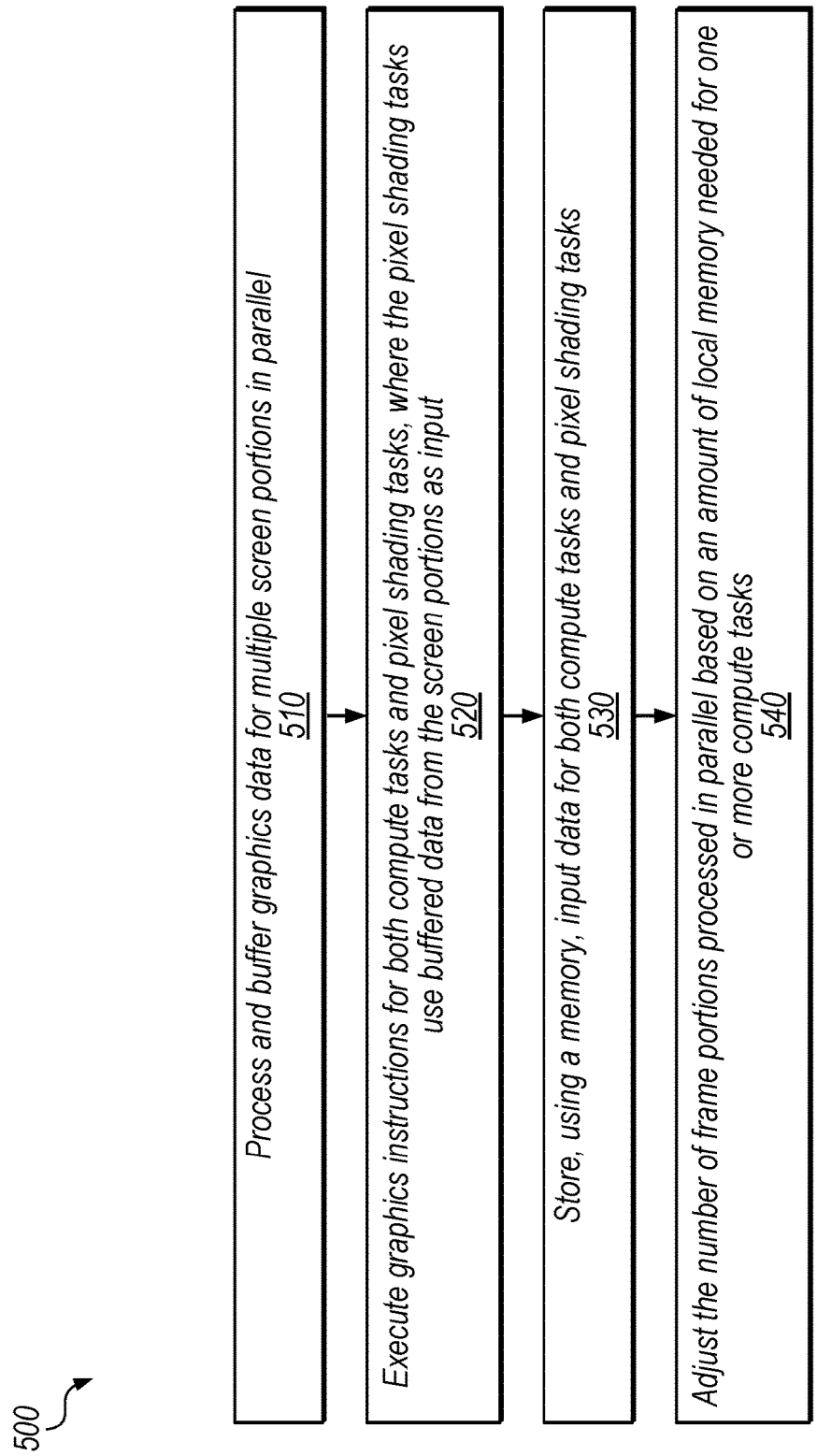
FIG. 5 is a flow diagram illustrating an exemplary method for dynamically adjusting the number of frame portions processed in parallel, according to some embodiments.
Figure 6:
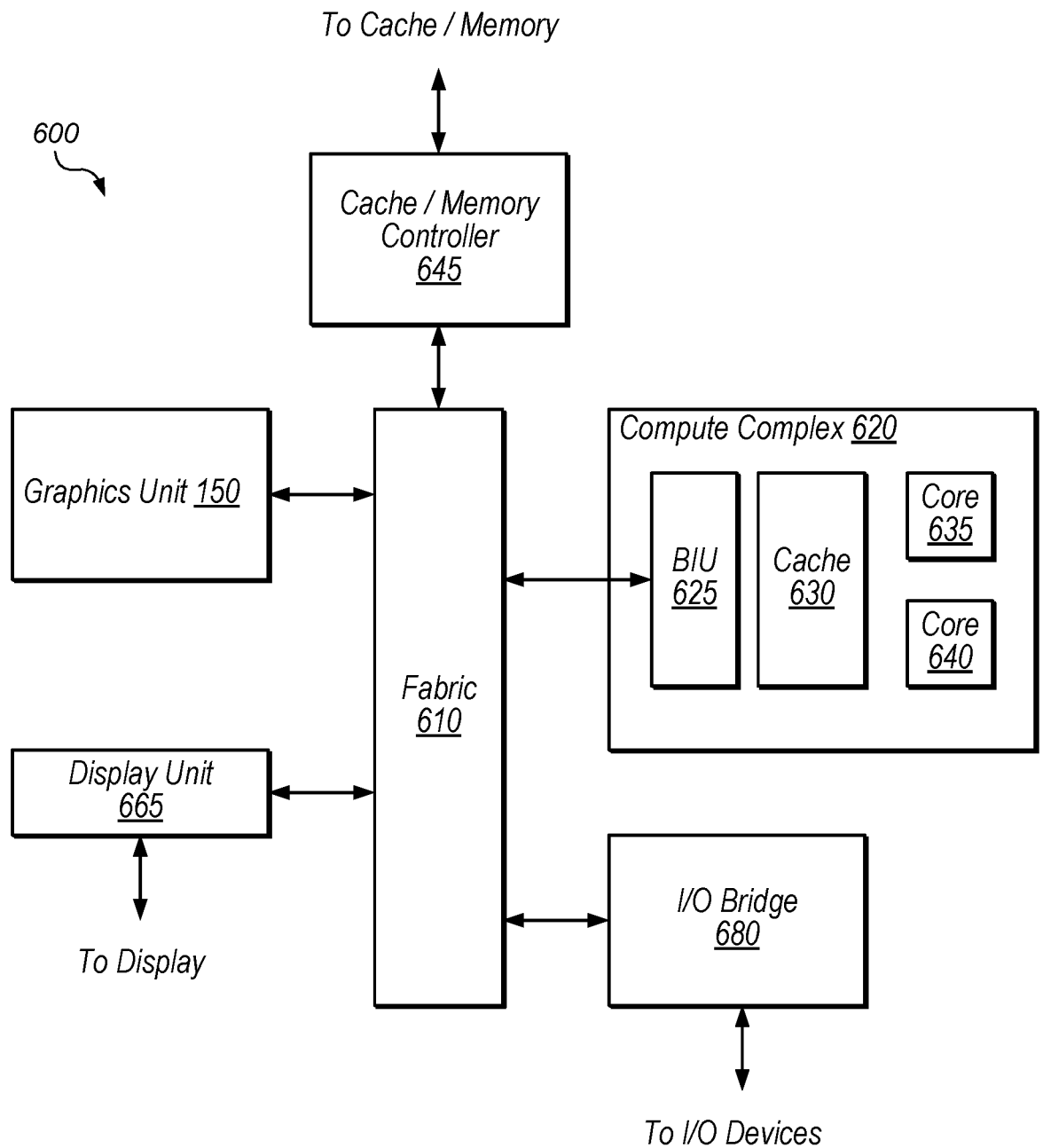
FIG. 6 is a block diagram illustrating one embodiment of a device that includes a graphics unit.
Figure 7:
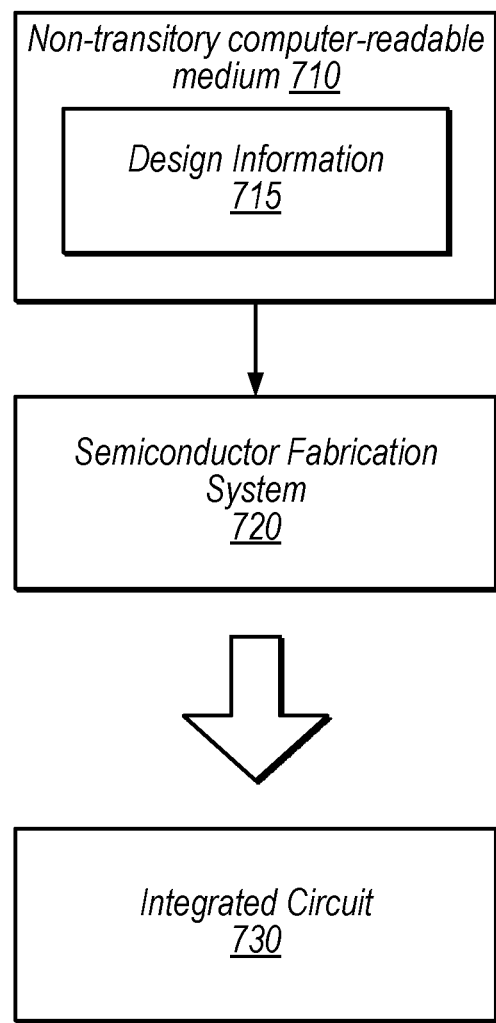
FIG. 7 is a block diagram illustrating an exemplary computer-readable medium, according to some embodiments.

This disclosure initially describes, with reference to FIGS. 1A-1B, a generalized overview of a graphics processing flow and an exemplary graphics unit. FIG. 2 illustrates exemplary sharing of a local memory in a programmable shader between compute and pixel shading tasks. FIG. 3 illustrates a more detailed embodiment of the circuitry of FIG. 2 with sort circuitry that processes multiple frame portions in parallel. FIG. 4 illustrates exemplary parallel processing and allocation intervals. FIG. 5 illustrates an exemplary method, FIG. 6 illustrates an exemplary device, and FIG. 7 illustrates an exemplary computer-readable medium. In various embodiments, the disclosed techniques may provide efficient allocation of a shared memory between pixel shading tasks and other tasks, which may in turn improve performance and/or reduce power consumption.

Graphics Processing Overview

Referring to FIG. 1A, a flow diagram illustrating an exemplary processing flow 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer) and/or ignoring one or more fragments (e.g., if they are covered by other objects). Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the exemplary steps of FIG. 1A may be performed in various orders, performed in parallel, or omitted. Additional processing steps may also be implemented.

Referring now to FIG. 1B, a simplified block diagram illustrating one embodiment of a graphics unit 150 is shown. In the illustrated embodiment, graphics unit 150 includes programmable shader 160, vertex pipe 185, fragment pipe 175, texture processing unit (TPU) 165, image write unit 170, memory interface 180, and texture state cache 190. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 and/or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 and/or programmable shader 160 to generate fragment data. Vertex pipe 185 and/or fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and/or TPU 165. Programmable shader 160 may be configured to perform vertex processing tasks on vertex data which may include various transformations and/or adjustments of vertex data. Programmable shader 160, in the illustrated embodiment, is also configured to perform fragment processing tasks on pixel data such as texturing and shading, for example. Programmable shader 160 may include multiple execution instances for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

In various embodiments, a programmable shader such as programmable shader 160 may be coupled in any of various appropriate configurations to other programmable and/or fixed-function elements in a graphics unit. The exemplary embodiment of FIG. 1B shows one possible configuration of a graphics unit 150 for illustrative purposes.

Exemplary Memory Allocation Techniques

FIG. 2 is a block diagram illustrating an exemplary programmable shader 160 with a shared local memory 225, according to some embodiments. In the illustrated embodiment, graphics unit 150 includes programmable shader 160, pixel control circuitry 240, and compute control circuitry 250.

Pixel control circuitry 240, in some embodiments, is configured to send pixel shading tasks to programmable shader 160. Programmable shader 160 may store input data for the shading tasks (e.g., fragment data) in local memory 225. In some embodiments, pixel control circuitry 240 is configured for tile-based rendering, in which different portions (e.g., square or rectangular tiles) of a frame buffer are separately rendered, and may later be combined to form a frame of graphics data. In some embodiments, frame portions are rectilinear (e.g., tiles) that include only right angles. In some embodiments, rectilinear frame portions include only four angles (e.g., to form squares or rectangles). For example, square tiles may vary in size from 8×8 pixels to 64×64 pixels in different implementations or in different processing modes of a given device. In this example, tile sizes may range from 64 to 4096 pixels. In some embodiments, pixel control circuitry 240 is configured to process multiple tiles in parallel. The amount of local memory 225 needed by pixel control circuitry 240 may be related to the number of tiles processed in parallel, among other factors (such as the sampling mode, precision of the inputs, tile size, etc.).

Compute control circuitry 250, in some embodiments, is configured to send compute tasks to programmable shader 160. Programmable shader 160 may store input data for compute tasks in local memory 225. Thus, local memory 225 is "shared" in the sense that it may be concurrently used to store input data for tasks from multiple different types of control circuitry. Although compute tasks are discussed herein, similar techniques may be used to handle allocation for other types of tasks, such as vertex tasks, etc.

Local memory 225 may be implemented using any of various appropriate memory technologies, and may be configured to receive data from one or more other elements in a cache/memory hierarchy. As shown in the illustrated embodiment, local memory 225 may be directly accessible to execution elements 315 (although these elements may also include one or more operand caches to cache input data at an even lower level). Local memory 225 may implement any of various appropriate data structures. U.S. patent application Ser. No. 15/388,804, for example, discusses a flexible "local image block" data structure that may be used to store data for various types of tasks in various graphics processing modes.

In the illustrated embodiment, graphics unit 150 is configured to send allocation information 255 to pixel control circuitry 240 to control allocation of memory in local memory 225. Allocation information may be determined and/or transmitted by various units, such as compute control circuitry 250, programmable shader 160, or scheduling circuitry (not shown in FIG. 2) that is configured to arbitrate between tasks from compute control circuitry 250 and pixel control circuitry 240, for example.

In some embodiments, pixel control circuitry 240 is configured to dynamically adjust the number of tiles processed in parallel based on allocation information 255. For example, if pixel control circuitry 240 is currently processing N tiles in parallel and allocation information 255 indicates a reduction in allocation such that only memory space for M tiles is available (where M is an integer less than M), pixel control circuitry 255 may refrain from beginning to process more tiles until tiles have completed processing such that at most M tiles are being processed in parallel. In some embodiments, the reduction in memory use by pixel control circuitry 240 may not be instantaneous, e.g., because once memory is allocated for a tile, it may need to stay allocated until processing of the tile is complete. In other embodiments, tile data for a tile currently being processed may be discarded to more rapidly reduce the number of tiles in parallel, and later re-introduced to pixel control circuitry 240, for example. In various embodiments, the disclosed techniques may avoid extended blocking of critical tasks from compute control circuitry 250 and/or may prevent compute tasks from locking out pixel shading tasks. In various embodiments, processing for different tiles may be time interleaved, which may hide long-latency operations (e.g., in the context of fragment shader discard, etc.).

Note that the memory space required per tile may vary depending on the current processing mode. For example, the number of samples per fragment/pixel, the filtering mode, tile size, precision of data, etc. may affect the amount of memory needed per frame portion. Therefore, in some embodiments, one or more processing elements are configured to determine an amount of memory currently needed per frame portion, based on various parameters. In various embodiments, allocation information may be specified in units of memory space (e.g., kilobytes) or in more abstract units such as tiles.

FIG. 3 is a block diagram illustrating a more detailed example of circuitry 300 that is included in graphics unit 150, according to some embodiments. In the illustrated embodiment, circuitry 300 includes programmable shader 160, scan converter 320, sort circuitry 330, and pixel control circuitry 340. Programmable shader 160, in the illustrated embodiment, includes execution elements 315, local memory 325, scheduling circuitry 345, and compute control circuitry 350.

The circuitry in FIGS. 2 and 3 is shown for purposes of illustration but the locations of the various processing elements may be different in other embodiments. For example, pixel control circuitry, scan converter 220, and sort circuitry 230 may or may not be included in fragment pipe 175. Similarly, compute control circuitry is not located in programmable shader 160, in some embodiments.

Scan converter 320, in the illustrated embodiment, is configured to rasterize primitives to generate fragment data and send the fragment data to sort circuitry 330. As used herein the term "primitive" is intended to be interpreted according to its accepted meaning which includes simple geometric objects that a graphics unit is configured to process, e.g., lines, triangles, other types of polygons, curves, etc. The term "fragment" is intended to be interpreted according to its accepted meaning which includes data needed to shade a pixel based on a given primitive (e.g., a reference to one or more shader programs to be executed by programmable shader 160 for the fragment, coordinates for the fragment, etc.), plus data needed to test whether the fragment survives to contribute to attributes of a corresponding pixel (e.g., depth, alpha, stencil, scissor, window ID, etc.). In some rendering modes, fragment data may include data for multiple samples per fragment/pixel. The fragment data may be specified at one or more of various levels of granularity (e.g., fragment data may be stored per-sample or may be aggregated per-fragment, per-object, per-tile, etc.).

Sort circuitry 330, in the illustrated embodiment, includes multiple buffers 335A-N configured to aggregate fragment data for different frame portions (e.g., different tiles). In some embodiments, sort circuitry 330 is configured to determine to track which fragments are currently visible until they are shaded. For example, data for a fragment that is covered by an opaque object that is nearer to the screen in a scene being rendered may be discarded from a buffer 335 because it is determined not to be visible. Such occlusion techniques may reduce the processing required by programmable shader 160, in various embodiments, by reducing overdraw (which occurs when fragments are shaded but do not end up contributing to pixel attributes). Including multiple buffers may allow parallel processing of multiple screen portions. Various numbers of buffers 335 may be included in different embodiments. In some embodiments, the number of buffers 335 sets an upper limit on the number of tiles that graphics unit 150 is capable of processing in parallel.

Various events may cause flushing of fragment data 345 in a buffer 335 to programmable shader 160 for processing. Each flush of data may be referred to as a pass group, and processing order may not matter for fragments in the same pass group (although the ordering of processing for fragments in different pass groups for the same tile may be important to achieving correct shading results). Flushed data from a buffer 335 may be stored in local memory 225 until it is processed by execution elements 315.

Local memory 225, in the illustrated embodiment, is configured to store input data for both pixel and compute tasks from pixel control circuitry 240 and compute control circuitry 250 respectively. Scheduling circuitry 345, in the illustrated embodiment, is configured to receive requests from compute control circuitry 250 and pixel control circuitry 240. Scheduling circuitry 345 may also fetch and store instructions to be executed by execution elements 315 for requested tasks, form single instruction multiple data (SIMD) groups for threads, form thread groups, etc.

In the illustrated embodiment, scheduling circuitry 345 is configured to send allocation information 255 to sort circuitry 330 and sort circuitry 330 is configured to dynamically adjust the number of frame portions that it processes in parallel based on allocation information 255. In other embodiments, compute control circuitry 250 may send allocation information 255 directly to sort circuitry 330 or pixel control circuitry 240. In other embodiments, any of various circuitry may transmit allocation information 255.

In some embodiments, other allocation information (not explicitly shown) may be transmitted to compute control circuitry 250. For example, if sort circuitry 330 needs a relatively small portion of local memory 225, this may allow compute control circuitry 250 to have use larger allocation, based on allocation information, which may allow compute control circuitry 250 to send more compute tasks for execution. In some embodiments, arbitration circuitry, e.g., in scheduling circuitry 345, is configured to receive information that indicates current pixel shading and compute workloads and assign allocations in local memory 225 based on this information.

In some embodiments, various arbitration techniques may be implemented between various types of control circuitry, causing at least some of the control circuitry to adjust parallel processing of frame portions. For example, multiple tile-based data masters may be implemented and may each adjust the number of tiles processed in parallel based on allocation information. Other types of data masters such as a vertex data master may use shared memory data and may be included in arbitration. Arbitration techniques used to generate allocation information for various data masters may prioritize certain types of tasks and/or may provide fair sharing, e.g., based on quality of service requirements for each type of requesting control circuitry.

FIG. 4 is a diagram illustrating exemplary task processing and memory allocation for pixel and compute tasks, according to some embodiments. In the illustrated embodiment, pass groups for three different frame portions (e.g., tiles) A, B, and C are processed for pixel shading (left-hand side of the diagram) while thread groups A-K are processed for compute tasks (right-hand side of the diagram).

In the illustrated embodiment, frame portion A includes three pass groups A1, A2, and A3. As shown by the brackets in the figure, an allocation in local memory 225 is maintained for frame portion A during a time interval that ends when the last pass group (A3 in this example) is processed. Similarly, memory allocations for frame portions B and C may be needed during processing of pass groups for those frame portions. As shown, processing for different frame portions may be interleaved, and the memory allocation may persist until processing for a frame portion is finished. In some embodiments, processing for pass groups for different frame portions may also be performed at least partially in parallel by programmable shader 160 (e.g., in addition to or in place of interleaved processing).

In some embodiments, memory allocation for a compute thread group may only persist during processing for that thread group. Therefore, stalling between thread groups may allow compute resources to deallocate as work finished from programmable shader 160. Stalling the compute pipeline in the middle of a thread group, on the other hand, may leave the local memory allocation and thread resources for that thread group. Note that, although the illustrated thread groups are executed serially, thread groups may be executed in an interleaved fashion and/or at least partially in parallel, in various embodiments. Executing thread groups using interleaving, for example, may help hide latency.

In some embodiments, graphics unit 150 is configured to adjust the number of frame portions processed in parallel by stalling the pixel pipeline when processing for a frame portion is complete, which may free the allocation for that frame portion (and keep it free, if processing for another frame portion is stalled). For example, if sort circuitry 330 were to include buffers for four frame portions and all buffers were being used, sort circuitry 330 may reduce to processing three frame portions in parallel (e.g., leaving a buffer 335 unused) after frame portion A has been processed. In various embodiments, the dynamic adjustment in number of tiles simultaneously processed may be based on allocation information 255. Graphics unit 150 may adjust allocation information 255 based on detecting certain types of compute work, such as high-priority compute work, long-waiting compute tasks, etc.

Allocation information 255 may be specified in various units. For example, it may specify a number of frame portions to process in parallel. In other embodiments, it specifies an amount of memory (e.g., in bytes, kilobytes, etc.) available for pixel tasks. If pixel control circuitry 240 is currently using more than the allocation, it may begin to reduce the number of frame portions processed in parallel until it meets its current allocation. Once its allocation is met, waiting tasks from compute control circuitry 250 may be allowed to proceed.

In various embodiments, the adjustment in the number of frame portions processed in parallel may be performed during a render, and the number may be adjusted multiple times during the render. Thus, the number of frame portions processed in parallel may be different at different times during a render. This may allow fine-grained adjustment of memory allocation to improve performance depending on pixel and compute workloads.

Exemplary Method

FIG. 5 is a flow diagram illustrating an exemplary method 500 for dynamically adjusting the number of frame portions (e.g., tiles) processed in parallel, based on memory allocation considerations, according to some embodiments. The method shown in FIG. 5 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

At 510, in the illustrated embodiment, circuitry (e.g., sort circuitry 330) processes and buffers graphics data (e.g., fragment data) for multiple screen portions (e.g., tiles) in parallel. This may include using multiple physical buffers to store non-occluded fragments for different tiles, for example. The fragment data from the buffers may eventually be transferred to local memory 225 for shader processing by execution elements 315.

At 520, in the illustrated embodiment, shader circuitry (e.g., programmable shader 160) executes graphics instructions for both compute tasks and pixel shading tasks. Note that although compute and pixel shading tasks are discussed herein for purposes of illustration, the disclosed techniques may be utilized to handle memory allocations between any of various different types of processing tasks. The different types of tasks may be processed in a time-interleaved fashion, at least partially in parallel using different hardware resources, or both. In the illustrated embodiment, the pixel shading tasks use buffered data from the screen portions as input.

At 530, in the illustrated embodiment, a memory (e.g., local memory 255) stores input data for both compute tasks and pixel shading tasks. The memory may be a local memory that is directly available to execution circuitry in programmable shader 160. In various embodiments, the memory is located in programmable shader 160. Memory at this level may be accessed quickly but may be constrained in size, relative to memories at higher levels in a cache/memory hierarchy for graphics unit 150.

At 540, in the illustrated embodiment, the graphics unit adjusts the number of frame portions processed in parallel based on an amount of local memory needed for one or more compute tasks. For example, scheduling circuitry may generate allocation information 255 for sort circuitry 330. In some embodiments, the adjustment is performed mid-render such that different numbers of screen portions are processed in parallel at different points in time during the render. The allocation information may be specified in units of memory space (e.g., bytes, kilobytes, megabytes, etc.) or in calculated units such as a number of tiles, for example. In some embodiments, to reduce a number of frame portions processed in parallel, graphics unit 150 is configured to wait until processing of a frame portion is complete and then refrain from scheduling processing for another frame portion using the relinquished hardware resources. To increase a number of frame portions processed in parallel, graphics unit 150 may schedule processing for another frame portion, in addition to frame portions already being processed in parallel.

In some embodiments, pixel control circuitry 240 generates allocation information relating to a number of tiles currently being processed in parallel, a number of tiles expected to be processed in parallel in a future time interval, or an amount of space in local memory 225 needed for pixel shading tasks. In these embodiments, compute control circuitry 250 and/or scheduling circuitry 345 may adjust scheduling of compute tasks to take advantage of unused space in local memory 225, based on the allocation information from pixel control circuitry 240.

In various embodiments, the disclosed techniques may advantageously improve performance by reducing stalling and allowing dynamic adjustment of memory use during a render. These techniques may also reduce overall power consumption.

Exemplary Device

Referring now to FIG. 6, a block diagram illustrating an exemplary embodiment of a device 600 is shown. In some embodiments, elements of device 600 may be included within a system on a chip. In some embodiments, device 600 may be included in a mobile device, which may be battery-powered. Therefore, power consumption by device 600 may be an important design consideration. In the illustrated embodiment, device 600 includes fabric 610, compute complex 620 input/output (I/O) bridge 650, cache/memory controller 645, graphics unit 680, and display unit 665. In some embodiments, device 600 may include other components (not shown) in addition to and/or in place of the illustrated components, such as video processor encoders and decoders, image processing or recognition elements, computer vision elements, etc.

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally.

In the illustrated embodiment, compute complex 620 includes bus interface unit (BIU) 625, cache 630, and cores 635 and 640. In various embodiments, compute complex 620 may include various numbers of processors, processor cores and/or caches. For example, compute complex 620 may include 1, 2, or 4 processor cores, or any other suitable number. In one embodiment, cache 630 is a set associative L2 cache. In some embodiments, cores 635 and/or 640 may include internal instruction and/or data caches. In some embodiments, a coherency unit (not shown) in fabric 610, cache 630, or elsewhere in device 600 may be configured to maintain coherency between various caches of device 600. BIU 625 may be configured to manage communication between compute complex 620 and other elements of device 600. Processor cores such as cores 635 and 640 may be configured to execute instructions of a particular instruction set architecture (ISA) which may include operating system instructions and user application instructions.

Cache/memory controller 645 may be configured to manage transfer of data between fabric 610 and one or more caches and/or memories. For example, cache/memory controller 645 may be coupled to an L3 cache, which may in turn be coupled to a system memory. In other embodiments, cache/memory controller 645 may be directly coupled to a memory. In some embodiments, cache/memory controller 645 may include one or more internal caches.

As used herein, the term "coupled to" may indicate one or more connections between elements, and a coupling may include intervening elements. For example, in FIG. 6, graphics unit 150 may be described as "coupled to" a memory through fabric 610 and cache/memory controller 645. In contrast, in the illustrated embodiment of FIG. 6, graphics unit 150 is "directly coupled" to fabric 610 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In some embodiments, graphics unit 150 is configured to perform one or more of the memory consistency, mid-render compute, local image block, and/or pixel resource synchronization techniques discussed above.

Display unit 665 may be configured to read data from a frame buffer and provide a stream of pixel values for display. Display unit 665 may be configured as a display pipeline in some embodiments. Additionally, display unit 665 may be configured to blend multiple frames to produce an output frame. Further, display unit 665 may include one or more interfaces (e.g., MIPI® or embedded display port (eDP)) for coupling to a user display (e.g., a touchscreen or an external display).

I/O bridge 650 may include various elements configured to implement: universal serial bus (USB) communications, security, audio, and/or low-power always-on functionality, for example. I/O bridge 650 may also include interfaces such as pulse-width modulation (PWM), general-purpose input/output (GPIO), serial peripheral interface (SPI), and/or inter-integrated circuit (I2C), for example. Various types of peripherals and devices may be coupled to device 600 via I/O bridge 650.

In some embodiments, various elements of device 600 may include clock gaters arranged hierarchically, including various series of DET clock gaters coupled to deliver clock signals to different portions of a clock tree. The disclosed techniques may reduce switching power consumption in device 600, balance the clock delay to different portions of device 600, reduce errors in device 600, achieve higher frequency, achieve required frequency at a lower power supply voltage, reduce energy dissipated per cycle (or per task, per pixel, or per byte, for example), etc.

Exemplary Computer-Readable Medium

The present disclosure has described various exemplary circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

FIG. 7 is a block diagram illustrating an exemplary non-transitory computer-readable storage medium that stores circuit design information, according to some embodiments. In the illustrated embodiment semiconductor fabrication system 720 is configured to process the design information 715 stored on non-transitory computer-readable medium 710 and fabricate integrated circuit 730 based on the design information 715.

Non-transitory computer-readable medium 710, may comprise any of various appropriate types of memory devices or storage devices. Medium 710 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Medium 710 may include other types of non-transitory memory as well or combinations thereof. Medium 710 may include two or more memory mediums which may reside in different locations, e.g., in different computer systems that are connected over a network.

Design information 715 may be specified using any of various appropriate computer languages, including hardware description languages such as, without limitation: VHDL, Verilog, SystemC, SystemVerilog, RHDL, M, MyHDL, etc. Design information 715 may be usable by semiconductor fabrication system 720 to fabrication at least a portion of integrated circuit 730. The format of design information 715 may be recognized by at least one semiconductor fabrication system 720. In some embodiments, design information 715 may also include one or more cell libraries which specify the synthesis and/or layout of integrated circuit 730. In some embodiments, the design information is specified in whole or in part in the form of a netlist that specifies cell library elements and their connectivity. Design information 715, taken alone, may or may not include sufficient information for fabrication of a corresponding integrated circuit. For example, design information 715 may specify the circuit elements to be fabricated but not their physical layout. In this case, design information 715 may need to be combined with layout information to actually fabricate the specified circuitry.

Semiconductor fabrication system 720 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 720 may also be configured to perform various testing of fabricated circuits for correct operation.

In various embodiments, integrated circuit 730 is configured to operate according to a circuit design specified by design information 715, which may include performing any of the functionality described herein. For example, integrated circuit 730 may include any of various elements shown in FIGS. 1B, 2, and/or 3. Further, integrated circuit 730 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A graphics processing apparatus, comprising:
   sort circuitry configured to process and buffer graphics data for multiple frame portions of the same graphics frame in parallel, wherein each of the multiple frame portions includes multiple pixels in each of first and second dimensions;
   programmable shader circuitry configured to execute graphics instructions based on requests by compute circuitry configured to request compute tasks and requests by pixel circuitry configured to request pixel shading tasks that use buffered data from the sort circuitry as input data;

a memory configured to store input data for operations performed by the programmable shader circuitry for both compute tasks and pixel shading tasks; and schedule circuitry configured to:
determine an amount of memory needed for one or more compute tasks based on requests from the compute circuitry; and
control the sort circuitry to change from processing a first number of frame portions in parallel for the pixel shading tasks during a first time interval to processing a second, different number of frame portions in parallel for the pixel shading tasks during a second time interval, based on the determined amount of local memory needed for one or more compute tasks.

2. The apparatus of claim 1, wherein the apparatus is configured to change the number of frame portions processed in parallel during a render of a frame of graphics data such that the sort circuitry processes different numbers of frame portions in parallel at different times during the render.

3. The apparatus of claim 1, wherein the apparatus is configured to generate allocation information for the sort circuitry to change the number of frame portions.

4. The apparatus of claim 3, wherein the allocation information is specified in units of frame portions or units of memory space.

5. The apparatus of claim 1, wherein the apparatus is configured, to reduce a number of frame portions processed in parallel, to wait until processing is finished for a first frame portion and refrain from scheduling processing from another frame portion using hardware resources used to process the first frame portion.

6. The apparatus of claim 1, wherein the frame portions are rectilinear polygons with four corners that each include a number of pixels in the range of 64 pixels to 4096 pixels.

7. The apparatus of claim 1, wherein the sort circuitry is configured to discard data for occluded fragments and buffer at least a portion of remaining fragments.

8. The apparatus of claim 1, wherein the memory is a local memory included in the programmable shader circuitry.

9. A non-transitory computer readable storage medium having stored thereon design information that specifies a design of at least a portion of a hardware integrated circuit in a format recognized by a semiconductor fabrication system that is configured to use the design information to produce the circuit according to the design, including:

sort circuitry configured to process and buffer graphics data for multiple frame portions of the same graphics frame in parallel, wherein each of the multiple frame portions includes multiple pixels in each of first and second dimensions;

programmable shader circuitry configured to execute graphics instructions based on requests by compute circuitry configured to request compute tasks and requests by pixel circuitry configured to request pixel shading tasks that use buffered data from the sort circuitry as input data;

a memory configured to store input data for operations performed by the programmable shader for both compute tasks and pixel shading tasks; and schedule circuitry configured to:
determine an amount of memory needed for one or more compute tasks based on requests from the compute circuitry; and
control the sort circuitry to change from processing a first number of frame portions in parallel for the pixel shading tasks during a first time interval to processing a second, different number of frame portions in parallel for the pixel shading tasks during a second time interval, based on the determined amount of local memory needed for one or more compute tasks.

10. The non-transitory computer readable storage medium of claim 9, wherein the circuit is configured to change the number of frame portions processed in parallel during a render of a frame of graphics data such that the sort circuitry processes different numbers of frame portions in parallel at different times during the render.

11. The non-transitory computer readable storage medium of claim 9, wherein the circuit is configured to generate allocation information based on which the sort circuitry is configured to change the number of frame portions.

12. The non-transitory computer readable storage medium of claim 9, wherein the circuit is configured, to reduce a number of frame portions processed in parallel, to wait until processing is finished for a first frame portion and refrain from scheduling processing from another frame portion using hardware resources used to process the first frame portion.

13. The non-transitory computer readable storage medium of claim 9, wherein the design information further specifies that the sort circuitry is configured to discard data for occluded fragments and buffer at least a portion of remaining fragments.

14. An apparatus, comprising:
first circuitry configured to process and buffer graphics data for multiple frame portions in parallel, wherein each of the multiple frame portions includes multiple pixels in each of first and second dimensions;

programmable shader circuitry configured to execute graphics instructions for both pixel shading tasks associated with different frame portions and other tasks, wherein the pixel shading tasks use buffered data from the first circuitry as input data; and a memory configured to store input data for operations performed by the programmable shader for both pixel shading tasks and other tasks;

schedule circuitry configured to:
determine an amount of memory needed for one or more other tasks based on requests from other tasks; and
control the first circuitry to change from processing a first number of frame processed in parallel for the pixel shading tasks during a first time interval to processing a second, different number of frame portions in parallel for the pixel shading tasks during a second time interval, based on the determined amount of local memory needed for one or more other tasks.

15. The apparatus of claim 14, wherein the apparatus is configured to change the number of frame portion processed in parallel during a render of a frame of graphics data such that the first circuitry processes different numbers of frame portions in parallel at different times during the render.

16. The apparatus of claim 14, wherein the other tasks include compute tasks requested by compute control circuitry.

17. The apparatus of claim 14, wherein the apparatus is configured to generate allocation information for the first circuitry to change the number of frame portions.

18. The apparatus of claim 17, wherein the allocation information is specified in units of memory space.

19. The apparatus of claim 14, wherein the apparatus is configured, to reduce a number of frame portions processed in parallel, to wait until processing is finished for a first frame portion and refrain from scheduling processing from another frame portion using hardware resources used to process the first frame portion.

20. The apparatus of claim 14, wherein the first circuitry is configured to discard data for occluded fragments and buffer at least a portion of remaining fragments.

* * * * *